March 23, 1971     R. C. MOTT     3,572,208
PNEUMATIC ANNUNCIATION SYSTEM
Filed Dec. 30, 1968
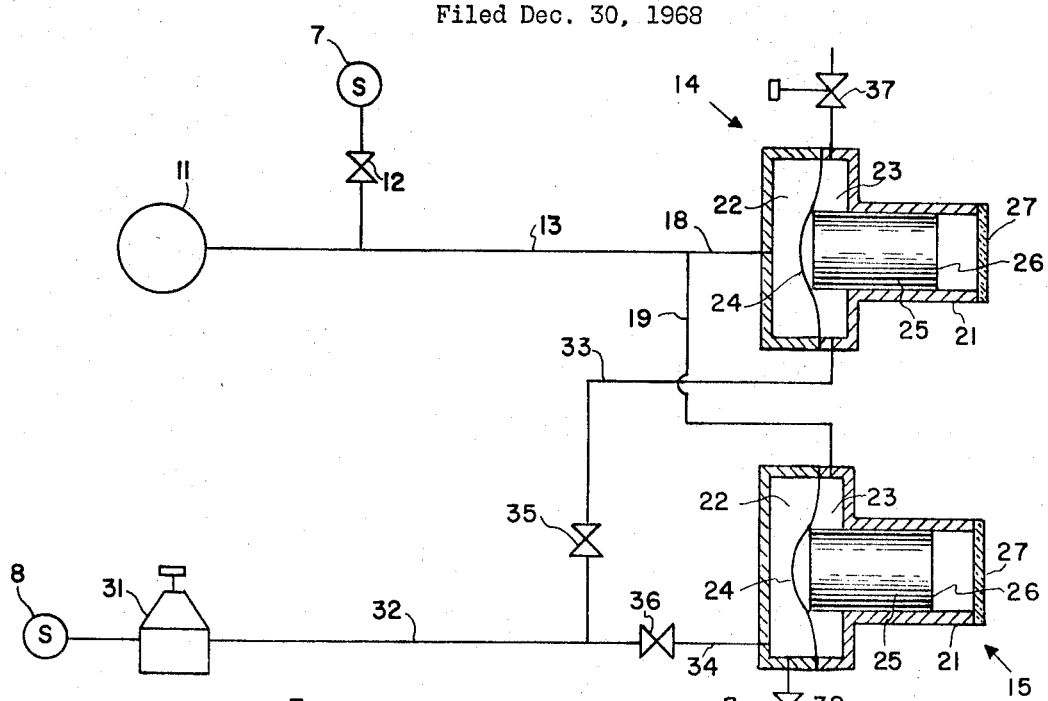
Fig. 1
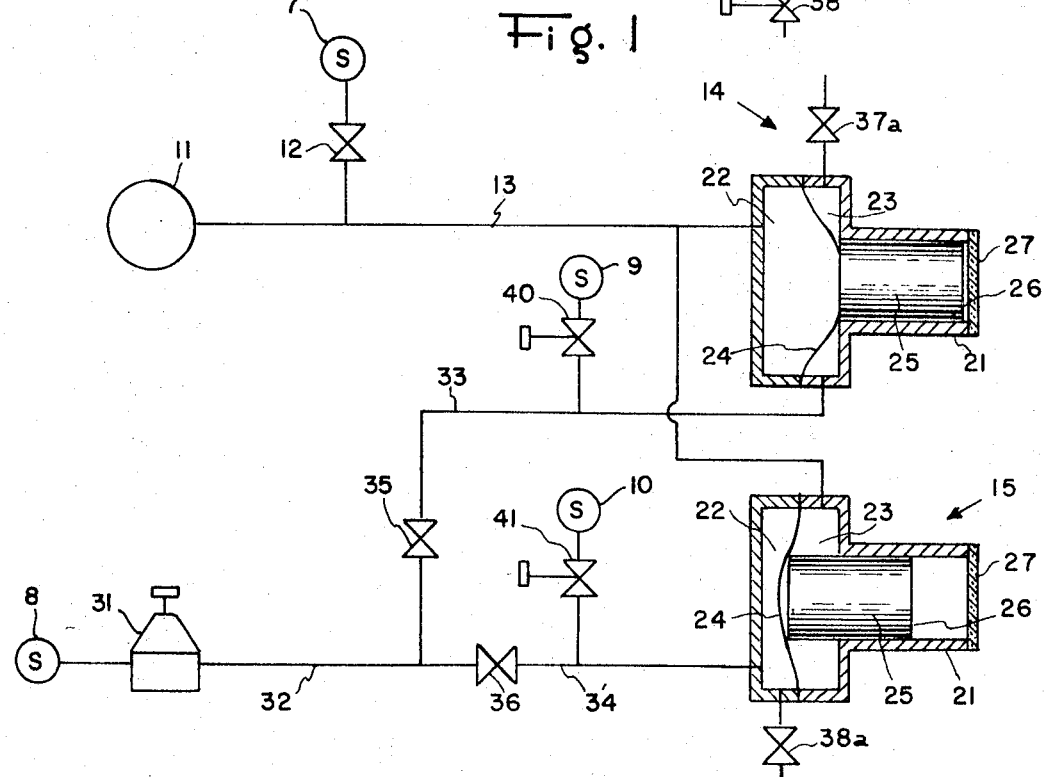
Fig. 2
INVENTOR.
RICHARD C. MOTT
BY 
ATTORNEY March 23, 1971     N. A. TERNES     3,572,228
PHOTOGRAPHIC FILM PREREGISTER SYSTEM FOR CAMERAS
Filed Oct. 15, 1968
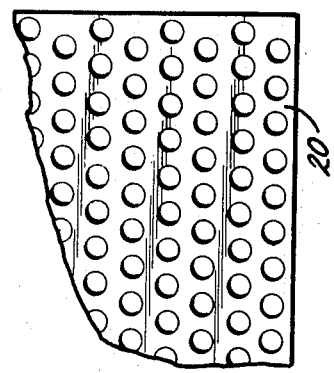
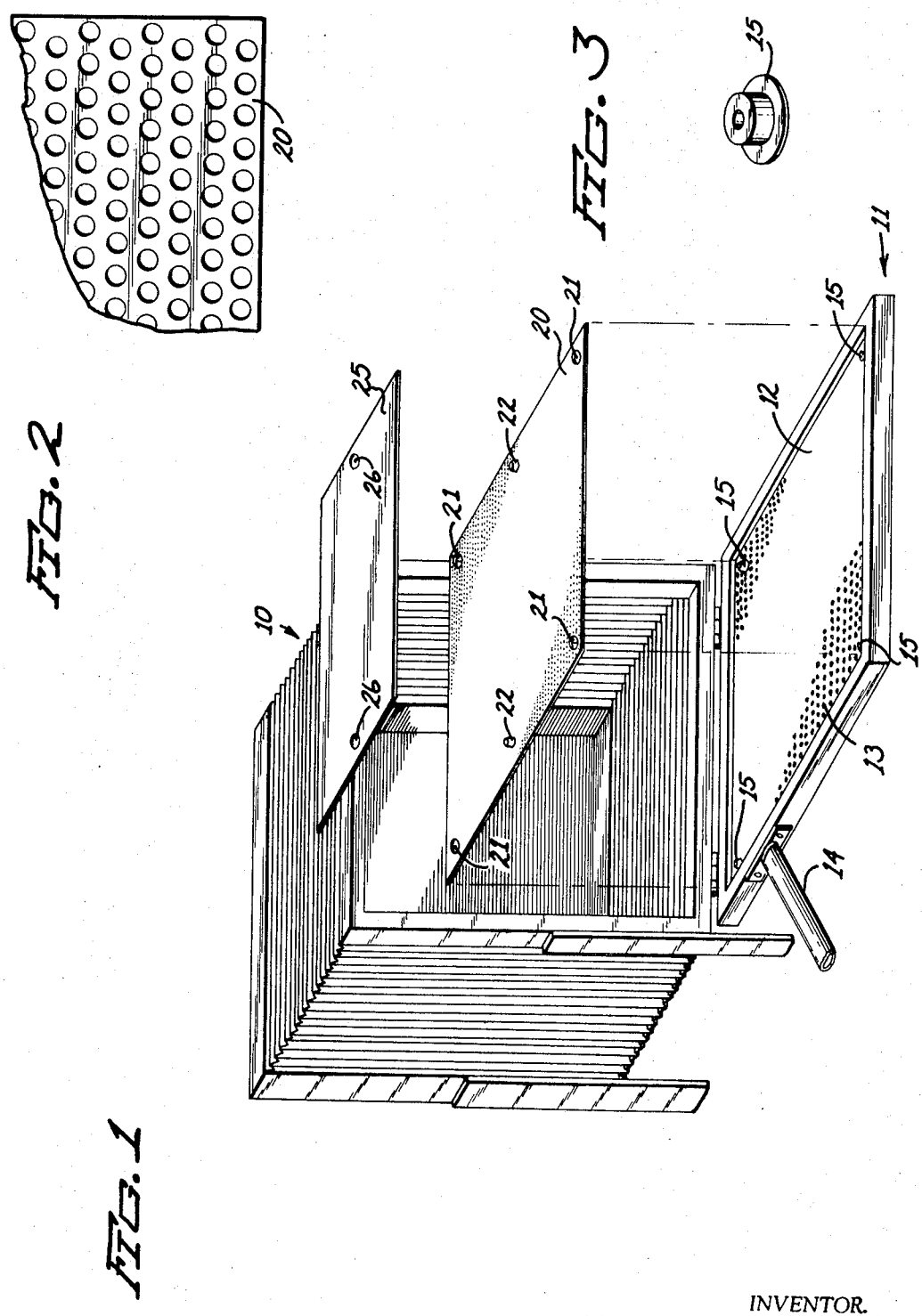
INVENTOR.
*Norman A. Ternes*
BY
MERCHANT & GOULD
ATTORNEYS United States Patent Office  3,572,228
Patented Mar. 23, 1971

3,572,228
PHOTOGRAPHIC FILM PREREGISTER SYSTEM FOR CAMERAS
Norman A. Ternes, 387 Minnesota Ave.,
St. Paul, Minn. 55413
Filed Oct. 15, 1968, Ser. No. 767,642
Int. Cl. G03b 19/00
U.S. Cl. 95—11                                               2 Claims

ABSTRACT OF THE DISCLOSURE

A plurality of pins fixedly attached to the film receiving surface of a camera having a vacuum back and a rigid screen having a plurality of holes therethrough positioned to cooperate with the pins to hold the rigid screen parallel and in juxtaposition to the film receiving surface of the camera back. The rigid screen has at least a pair of pins extending outwardly therefrom for receiving a prepunched sheet of photographic film thereon so that the holes in the film can be used as constant reference points for an exposure, or picture, on the film.

BACKGROUND OF THE INVENTION

Field of the invention

In photography, and especially in color separation, it is often necessary to provide precise register marks on the film so that a series or sequence of photographs can be positioned in precise overlying relationship to produce a complete picture. For example, in color separation a first separation is taken of all the portions of a picture which are a first color. Then a second separation is taken of all the portions which are a second color, etc. The number of photographs required is dependent upon the number of colors present in the picture. So that each of the portions of the picture color separated can be recombined into a complete picture during the assembly process for stripping, plate making and printing, it is necessary that the separations be precisely located on the film with reference to register marks.

Description of the prior art

In the prior art one general method of providing for registering color separations is to provide register marks on the drawing or picture prior to photographing the various color separations. Then, each photograph or color separation has a register mark thereon which is visually aligned to place the various separations in register. This method can be very time consuming and in many instances not completely accurate.

Many extremely complicated preregister systems have been developed and incorporated into cameras, most of which are comprised of lines and register marks for visually aligning film prior to the exposure thereof. These preregister systems are generally complicated to operate and extremely costly.

SUMMARY OF THE INVENTION

The present invention pertains to a photographic film preregister system including a plurality of spaced apart projections fixedly attached to the film receiving surface of the film holder in a camera and a rigid plate having a plurality of openings corresponding in position to the position of the projections with at least two spaced apart projections on the plate positioned to receive a prepunched sheet of photographic film thereon.

It is an object of the present invention to provide an improved and simplified photographic film preregister system for cameras.

It is a further object of the present invention to provide an improved photographic film preregister system which can be incorporated in substantially any of the presently existing cameras.

It is a further object of the present invention to provide a photographic film preregister system which is inexpensive and simple to operate and which is extremely accurate.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 1 is an exploded view in perspective of a camera, portions thereof removed, having the present photographic film preregister system affixed thereto;

FIG. 2 is an enlarged view of a portion of the rigid screen; and

FIG. 3 is an enlarged view in perspective of a pin.

DESCRIPTION OF THE PREFERRED EMBODIMENT

Referring to the figures the numeral 10 generally designates a camera having a vacuum back 11. The vacuum back 11 is hingedly attached to the camera 10 to allow the opening thereof for the placement and removal of sheets of film therein. A film receiving surface 12 forms a portion of the vacuum back 11 and is adapted to receive sheets of film in parallel juxtaposition thereon for exposure in the camera 10. The film receiving surface 12 has a plurality of holes or channels 13 therein which are connected to a vacuum pump (not shown) by means of a conduit 14. The holes 13 are designed to hold the sheets of film fixedly in position on the film receiving surface 12.

In the present preregister system a plurality of projections or pins 15, each of which may be formed similar to the pin 15 illustrated in FIG. 3, are fixedly attached to the film receiving surface 12 by some convenient means, such as gluing, brazing, or the like. In the present embodiment four pins 15 are positioned adjacent the corners of the film receiving surface 12, but it should be understood that the pins 15 might be located at the sides or in any other convenient location and any convenient number might be incorporated.

A rigid plate or screen 20 formed to overlie substantially the entire film receiving surface 12 has provided therein a plurality of openings 21 positioned to coincide with the positions of the pins 15 on the film receiving surface 12. If the camera 10 incorporates a vacuum back 11 a screen 20 should be utilized to allow a film holding vacuum to be formed therethrough. However, in the event that some other means, such as the present preregister system, are utilized to hold the film in position on the plate or screen 20, a solid rigid plate may be utilized. At least two pins 22, similar to pins 15, are affixed to the outwardly facing surface of the screen 20. The position of the pins 22 is determined by the size of film it is desired to utilize, as will become apparent presently.

A sheet of film 25 having the desired dimensions has openings 26 formed therein in a position to coincide with the pins 22 on the screen 20. In general, the openings 26 will be formed adjacent the outer edges of the film 25 to prevent wasting an undue amount of the film material. Thus, the screen 20 is positioned with the holes 21 aligned with the pins 15 and in parallel juxtaposition with the film receiving surface 12. The film 25 is then placed with the openings 26 therein in alignment with the pins 22 and in parallel juxtaposition with the outwardly facing surface of the screen 20. The pins 22 position the film 25 correctly on the screen 20 and the vacuum formed in the holes 13 holds the film 25 fixedly in position on the screen 20.

When it is desired to use a film of a different size a screen similar to screen 20 can be substituted therefor having pins 22 prepositioned thereon to receive the different size film. Thus, the present preregister system can be incorporated in substantially any camera and can accept or be utilized with substantially any size film which the camera will accept.

In the operation of the present preregister system the camera 10 is set in the usual manner and locked into position. A screen 20 having pins 22 fixed thereon to receive film 25 of the desired size is positioned on the film receiving surface 12 by means of the openings 21 and pins 15. The prepunched film 25 is then positioned over the pins 22 and the vacuum in the holes 13 holds it fixedly in place. By maintaining the camera 10 in the locked position additional sheets of prepunched film 25 can be placed in the camera 10 and a sequence or series of separations can be taken. Each of the separations will be positioned on its particular sheet of film, with reference to the openings 26, in exactly the same position. Thus, by aligning the openings 26 in the various sheets of film 25, by means of pins similar to pins 15, all of the separations can be placed in exact register to each other.

Thus, a photographic film preregister system is disclosed which can be incorporated in substantially any camera and which is inexpensive to produce and simple to operate. Further, by forming the openings 21 in the screen 20 and the openings 26 in the film 25 approximately in the same diameter as the pins 15 on the film receiving surface 12 and the pins 22 on the screen 20, respectively, the accuracy of the preregister system can be maintained to well within .001 inch. Therefore, in addition to being simple to use the present preregister system is extremely accurate. Further, because the openings 26 are easy to align the separations can be quickly placed and replaced in any desired orientation.

What is claimed is:

1. A photographic film preregister system for cameras and the like incorporating a vacuum film holder adapted to receive a sheet of photographic film on a surface thereof and hold the photographic film in position on the surface by means of the vacuum, comprising:
   (a) a plurality of spaced apart projections fixedly attached to the film receiving surface of the film holder adjacent the outer edges thereof;
   (b) a rigid screen having a plurality of spaced apart openings therethrough corresponding in position with said projections for receiving said projections therethrough to maintain said screen in a predetermined position, substantially parallel with and in juxtaposition to the film receiving surface of said film holder, said screen being constructed for allowing a vacuum to be drawn therethrough for holding photographic film in position on tthe outwardly facing surface thereof; and
   (c) a plurality of spaced apart projections affixed to said plate to extend outwardly therefrom and generally away from the film receiving surface of said film holder for receiving thereon a sheet of photographic film having preformed openings therein corresponding in position with the position of said projections on said plate.

2. A photographic film preregister system for cameras and the like incorporating a vacuum film holder adapted to receive a sheet of photographic film on a surface thereof and hold the photographic film in position on the surface by means of the vacuum, comprising:
   (a) a rigid plate constructed of air pervious material for allowing a vacuum to be drawn therethrough and holding photographic film in position on the outwardly facing surface thereof;
   (b) a plurality of spaced apart first projections on one of said rigid plates and the film receiving surface of the film holder and a plurality of correspondingly positioned openings on the other of said rigid plate and the film receiving surface of the film holder for positioning said rigid plate substantially parallel with and in juxtaposition to the film receiving surface of said film holder with said openings and corresponding first projections engaged to maintain said rigid plate in position; and
   (c) a plurality of spaced apart second projections affixed to the outwardly facing surface of said rigid plate to extend outwardly therefrom and generally away from the film receiving surface of said film holder for receiving thereon a sheet of photographic film having preformed openings therein corresponding in position with the position of said projections on said plate.

References Cited

UNITED STATES PATENTS

| | | | |
|---|---|---|---|
| 1,996,966 | 4/1935 | Koppe | 33—184.5X |
| 2,609,613 | 9/1952 | Capers | 33—184.5 |
| 2,711,031 | 6/1955 | Kessler | 33—184.5 |
| 2,871,572 | 2/1959 | Gutzmer | 33—184.5 |
| 3,000,737 | 9/1961 | Barnhart | 33—184.5 |
| 3,067,666 | 12/1962 | Coffman | 33—184.5 |
| 3,148,584 | 9/1964 | Nappy | 355—73 |
| 3,259,046 | 7/1966 | Nishimura | 355—73 |
| 3,400,630 | 9/1968 | Carlson | 355—73 |

JOHN M. HORAN, Primary Examiner

A. MATHEWS, Assistant Examiner

U.S. Cl. X.R.

355—73; 33—184.5